(12) United States Patent
Chueh et al.

(10) Patent No.: US 10,754,031 B2
(45) Date of Patent: Aug. 25, 2020

(54) POWER CONTROL METHOD, DISTANCE MEASURING MODULE AND ELECTRONIC DEVICE

(71) Applicant: Shenzhen Goodix Technology Co., Ltd., Shenzhen, Guangdong (CN)

(72) Inventors: Shengchun Chueh, Taipei (TW); Mengta Yang, Taipei (TW)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 335 days.

(21) Appl. No.: 15/869,046

(22) Filed: Jan. 12, 2018

(65) Prior Publication Data

US 2019/0064352 A1 Feb. 28, 2019

Related U.S. Application Data

(63) Continuation of application No. PCT/CN2017/099119, filed on Aug. 25, 2017.

(51) Int. Cl.
| | |
|---|---|
| *G01C 3/08* | (2006.01) |
| *G01S 17/02* | (2020.01) |
| *G01S 7/486* | (2020.01) |
| *G01S 7/484* | (2006.01) |
| *G01S 17/89* | (2020.01) |
| *G01S 7/4911* | (2020.01) |
| *G01S 7/4912* | (2020.01) |
| *G01S 7/40* | (2006.01) |
| *G01S 7/481* | (2006.01) |
| *G01S 7/52* | (2006.01) |

(52) U.S. Cl.
CPC ............ *G01S 17/02* (2013.01); *G01S 7/4008* (2013.01); *G01S 7/481* (2013.01); *G01S 7/484* (2013.01); *G01S 7/4868* (2013.01); *G01S 7/4911* (2013.01); *G01S 7/4918* (2013.01); *G01S 7/52096* (2013.01); *G01S 17/89* (2013.01); *G01S 2007/4013* (2013.01)

(58) Field of Classification Search
CPC .. G01S 2007/4013; G01S 17/89; G01S 17/02; G01S 17/894; G01S 7/4868; G01S 7/4911; G01S 7/4918; G01S 7/4008; G01S 7/481; G01S 7/484; G01S 7/52096
USPC ........................................................ 356/5.01
See application file for complete search history.

(56) References Cited

U.S. PATENT DOCUMENTS

| 10,114,111 B2 * | 10/2018 | Russell ................... G01S 7/484 |
| 2009/0273770 A1 | 11/2009 | Bauhahn |
| 2016/0006914 A1 | 1/2016 | Neumann |

(Continued)

FOREIGN PATENT DOCUMENTS

| CN | 102157040 A | 8/2011 |
| CN | 102508256 A | 6/2012 |

(Continued)

*Primary Examiner* — Mark Hellner
(74) *Attorney, Agent, or Firm* — Winston Hsu

(57) ABSTRACT

The present application provides a power control method, applied in a distance measuring module comprising a light emitting unit. The power control method comprises steps of the light emitting unit emitting an incident light by a first emitting power in a first time; receiving a reflected light corresponding to the incident light; determining a distance between the distance measuring module and a target according to the reflected light; and adjusting an emitting power of the light emitting unit according to the distance.

18 Claims, 2 Drawing Sheets

(56) References Cited

U.S. PATENT DOCUMENTS

2016/0198091 A1 7/2016 Edwards
2017/0356981 A1* 12/2017 Yang .................... G01S 7/4868
2018/0341009 A1* 11/2018 Niclass ................ G01S 7/4816

FOREIGN PATENT DOCUMENTS

| CN | 103873699 A | 6/2014 |
|---|---|---|
| CN | 105765558 A | 7/2016 |
| CN | 106296716 A | 1/2017 |
| JP | 2011-17666 A | 1/2011 |
| JP | 2016-532396 A | 10/2016 |
| JP | 6205741 B2 | 10/2017 |

* cited by examiner

POWER CONTROL METHOD, DISTANCE MEASURING MODULE AND ELECTRONIC DEVICE

CROSS REFERENCE TO RELATED APPLICATIONS

The present application is a continuation of international application No. PCT/CN2017/099119, filed on Aug. 25, 2017, of which are incorporated herein by reference in its entirety.

FIELD OF THE INVENTION

The present application relates to a power control method, a distance measuring module and an electronic device, and more particularly, to a power control method, a distance measuring module and an electronic device capable of saving electric power and protecting eyes.

BACKGROUND

Optical distance measuring device may utilize 3D image sensing system to collect the distance/depth information related to a target. Through the distances/depths corresponding to the pixels of the 3D images, 3D image data is formed. 3D images are also called as distance images or depth images. The extra distance dimension may be applied in various applications, so as to obtain information between the camera and the object, to accomplish different tasks in the sensing area in the field.

The optical distance measuring device, which may be disposed in a smart phone, emits incident light via light-emitting diode (LED), and collects reflected light corresponding to the incident light by using the plurality of pixels circuits of the pixel array. In general, the incident light emitted by the LED is invisible light (e.g., infrared ray (IR)). However, it is possible for the user to unconsciously put the LED of the optical distance measuring device very close to his/her eyes, which is harmful to the user's eyes.

Therefore, it is necessary to improve the prior art.

SUMMARY

It is therefore a primary objective of the present application to provide a power control method, a distance measuring module and an electronic device capable of saving electric power and protecting eyes, to improve over disadvantages of the prior art.

To solve the problem stated in the above, an embodiment of the present application provides a power control method, applied in a distance measuring module comprising a light emitting unit. The power control method comprises steps of the light emitting unit emitting an incident light by a first emitting power in a first time; receiving a reflected light corresponding to the incident light; determining a distance between the distance measuring module and a target according to the reflected light; and adjusting an emitting power of the light emitting unit according to the distance.

For example, the step of adjusting an emitting power of the light emitting unit according to the distance comprises adjusting the emitting power to be greater than the first emitting power when the distance is greater than a specific value.

For example, the step of adjusting an emitting power of the light emitting unit according to the distance comprises adjusting the emitting power to be less than or equal to the first emitting power when the distance is less than a specific value.

For example, the step of determining a distance between the distance measuring module and a target according to the reflected light comprises obtaining an image according to the reflected light, wherein the image comprises a plurality of pixels; obtaining a plurality of pixel depth values corresponding to the plurality of pixels; and determining the distance between the distance measuring module and the target according to the plurality of pixel depth values.

For example, the step of determining the distance between the distance measuring module and the target according to the plurality of pixel depth values comprises determining the distance between the distance measuring module and the target to be a first depth value, when a pixel number, corresponding to a plurality of first pixels among the plurality of pixels, is greater than a specific number; wherein a pixel depth value corresponding to each first pixel is less than the first depth value.

For example, the step of determining the distance between the distance measuring module and the target according to the plurality of pixel depth values comprises determining the distance between the distance measuring module and the target to be a statistic of the plurality of pixel depth values.

For example, the power control method further comprises steps of obtaining an image according to the reflected light; and performing human face recognition on the image, and generating a recognition result. The step of adjusting an emitting power of the light emitting unit according to the distance comprises the step of adjusting the emitting power of the light emitting unit according to the recognition result and the distance.

For example, the step of adjusting the emitting power of the light emitting unit according to the recognition result and the distance comprises no more increasing the emitting power when the recognition result indicates that a human face image is included in the image and the distance is less than a specific value.

For example, the first time is less than a specific time interval.

For example, before the light emitting unit emits the incident light by the first emitting power, the power control method further comprises the steps of receiving an ambient light; and determining the first emitting power according to the ambient light.

An embodiment of the present application provides a distance measuring module, comprising a light emitting unit, emitting an incident light by a first emitting power in a first time; a light sensing unit, receiving a reflected light corresponding to the incident light; a processing unit, configured to execute the following steps: determining a distance between the distance measuring module and a target according to the reflected light; and adjusting an emitting power of the light emitting unit according to the distance.

An embodiment of the present application provides an electronic device comprising a distance measuring module. The distance measuring module comprises a light emitting unit, emitting an incident light by a first emitting power in a first time; a light sensing unit, receiving a reflected light corresponding to the incident light; a processing unit, configured to execute the following steps: determining a distance between the distance measuring module and a target according to the reflected light; and adjusting an emitting power of the light emitting unit according to the distance.

The embodiments of the present application may adjust the emitting power of the light emitting unit according to the distance between the distance measuring module and the target and also the human-face recognition result, which is capable of preventing the eyes of the user from receiving too much radiation energy and being harmed, and also saving electric power.

These and other objectives of the present application will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present application become more apparent, the following relies on the accompanying drawings and embodiments to describe the present application in further detail. It should be understood that the specific embodiments described herein are only for explaining the present application and are not intended to limit the present application.

Figure 1:
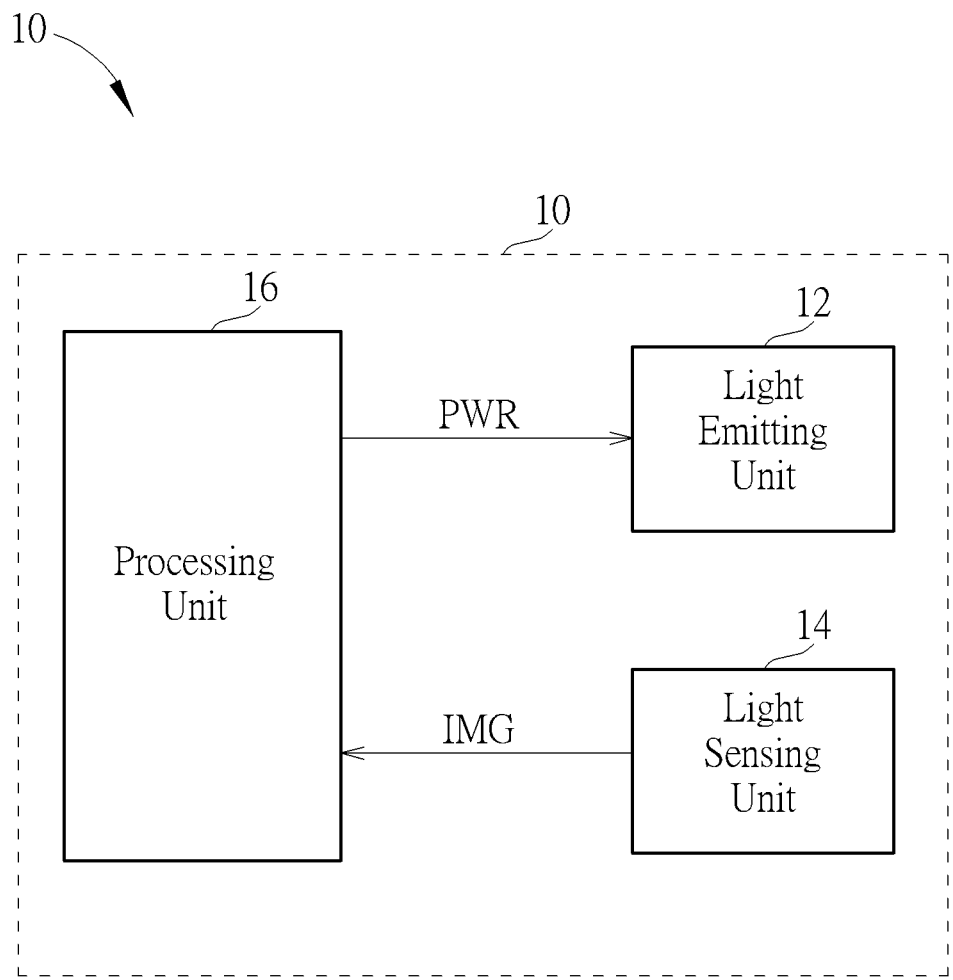
FIG. 1 is a schematic diagram of an electronic device according to an embodiment of the present application.

Please refer to FIG. 1. FIG. 1 is a schematic diagram of an electronic device 1 according to an embodiment of the present application. The electronic device 1, which may be a smart phone or a tablet computer, comprises a distance measuring module 10. The distance measuring module 10, which may utilize time of flight (ToF) distance measuring technique, comprises a light emitting unit 12, a light sensing unit 14 and a processing unit 16. The light emitting unit 12 may be a light emitting diode (LED), configured to emit an incident light. In an embodiment, the light emitting unit 12 may be LED emitting invisible light, e.g., IR (Infrared Ray) LED. The light sensing unit 14 may comprise a lens and a light sensing pixel array, which is configured to receive a reflected light corresponding to the incident light or an ambient light, and generate an image IMG according to the reflected light (or the ambient light). The processing unit 16 may comprise a digital signal processor (DSP), a general purpose processor or an application processor. The processing unit 16 may determine a distance D between the distance measuring module 10 and a target TG (not illustrated in FIG. 1) according to the reflected light, and adjust an emitting power PWR of the light emitting unit 12 according to the distance D.

In this case, when a user is front toward the light sensing unit 14 and (the eyes of) the user is (are) close to the light sensing unit 14, the distance measuring module 10 may adjust the emitting power PWR of the light emitting unit 12 lower, so as to prevent the eyes of the user from receiving too much radiation energy and being harmed, and to save electric power as well. On the other hand, when the user do not stare at the light sensing unit 14, or when the distance between (the eyes of) the user and the light sensing unit 14 is sufficiently large, the distance measuring module 10 may properly adjust the emitting power PWR of the light emitting unit 12 higher, so as to enhance the reflected light strength to improve signal-to-noise ratio (SNR) for the ToF distance measurement.

Figure 2:
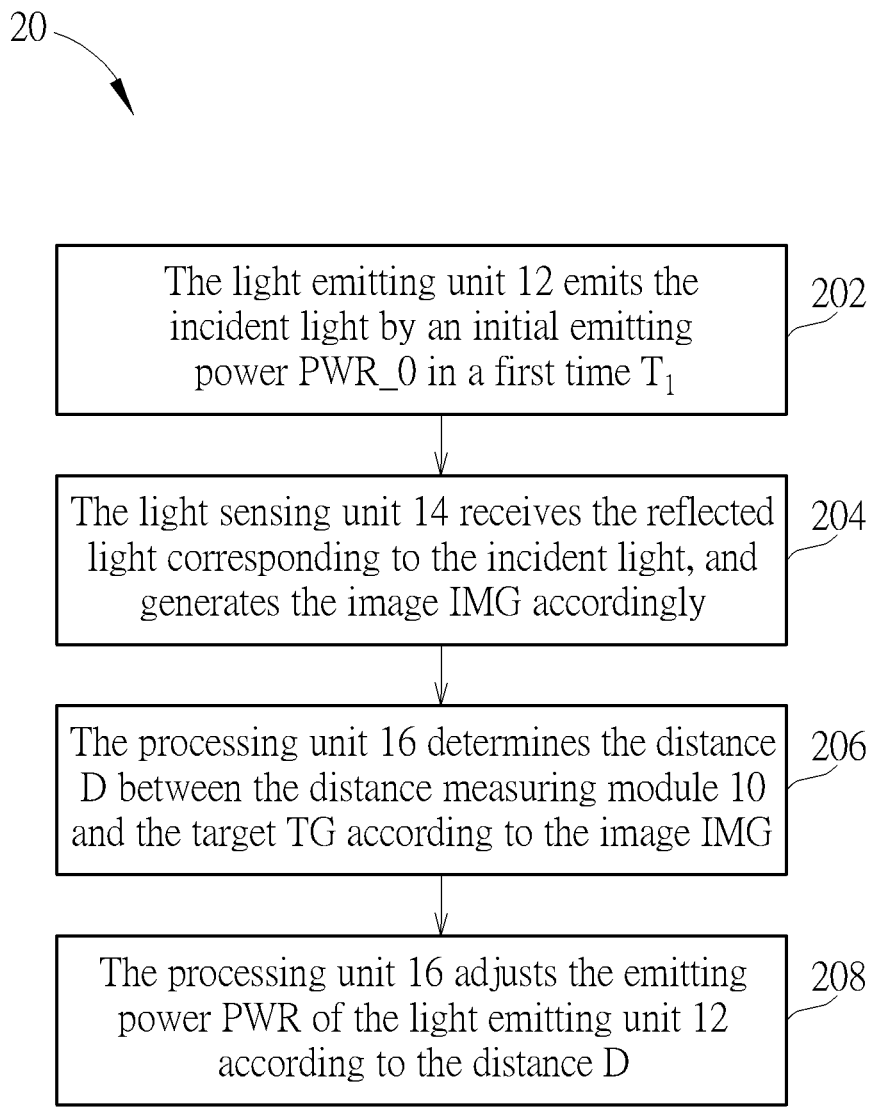
FIG. 2 is a flow chart of a power control method according to an embodiment of the present application.

Specifically, please refer to FIG. 2. FIG. 2 is a flow chart of a power control method 20 according to an embodiment of the present application. The power control method 20 may be executed by the distance measuring module 10. As shown in FIG. 2, the power control method 20 comprises the following steps:

Step 202: The light emitting unit 12 emits the incident light by an initial emitting power PWR_0 in a first time $T_1$.

Step 204: The light sensing unit 14 receives the reflected light corresponding to the incident light, and generates the image IMG accordingly.

Step 206: The processing unit 16 determines the distance D between the distance measuring module 10 and the target TG according to the image IMG.

Step 208: The processing unit 16 adjusts the emitting power PWR of the light emitting unit 12 according to the distance D.

When the distance measuring module 10 executes the power control method 20, the distance measuring module 10 may adjust the emitting power PWR of the light emitting unit 12 according to the distance D, so as to prevent the eyes of the user from being harmed, and to save electric power as well. Specifically, in Step 202, the distance measuring module 10 may emit the incident light in the short first time $T_1$ by the weak initial emitting power PWR_0. The first time $T_1$ may be less than a specific time interval, and the specific time interval may depend on practical situation.

In Step 204 and Step 206, the light sensing unit 14 receives the reflected light corresponding to the incident light, and generates the image IMG accordingly, where the image IMG comprises a plurality of pixels. The processing unit 16 determines the distance D between the distance measuring module 10 and the target TG according to the image IMG. In an embodiment, the processing unit 16 may obtain a plurality of pixel depth values corresponding to the plurality of pixels according to the reflected light corresponding to the incident light, and determine the distance D between the distance measuring module 10 and the target TG according to the plurality of pixel depth values. Details of obtaining the plurality of pixel depth values according to the reflected light are known by the art and not narrated herein for brevity.

In addition, the processing unit 16 is not limited to use certain methods to determine the distance D between the distance measuring module 10 and the target TG according to the plurality of pixel depth values. In an embodiment, the processing unit 16 may compare the plurality of pixel depth values with a first depth value Th. When a pixel number, of a set of pixels among the plurality of pixels of which the pixel depth values are less than the first depth value Th, is greater than a specific number N, the processing unit 16 may determine the distance D to be the first depth value Th (where the set of pixels among the plurality of pixels of which the pixel depth values are less than the first depth value Th may be regarded as a plurality of first pixels, i.e., the pixel depth value corresponding to each first pixel is less than the first depth value Th). In an embodiment, the processing unit 16 may determine the distance D to be a statistic of the plurality of pixel depth values. For example, the processing unit 16 may determine the distance D to be a minimum of the plurality of pixel depth values. Alternatively, the processing unit 16 may sort the plurality of pixel depth values in a descending order, and select a plurality of pixel depths (denoted as a plurality of first pixel depths) which is a % smallest of the plurality of plurality of pixel depth values, and determine the distance D to be an average of the plurality of first pixel depths, the percentage a % may be designed according to practical situation. As long as the processing unit 16 determines the distance D between the distance measuring module 10 and the target TG according to the plurality of pixel depth values, the requirements of the present application is satisfied, which is within the scope of the present application.

In Step 208, the processing unit 16 adjusts the emitting power PWR of the light emitting unit 12 according to the distance D. For example, when the distance D is greater than a specific value d1, representing that the distance D between the distance measuring module 10 and the target TG far enough, the processing unit 16 may adjust the emitting power PWR to be higher, which is to adjust the emitting power PWR to be greater than the initial emitting power PWR_0. When the distance D is less than a specific value d2, representing that the distance D between the distance measuring module 10 and the target TG is too close, for the sake of protecting eyes and save power, the processing unit 16 may adjust the emitting power PWR to be lower, which is to adjust the emitting power to be less than the initial emitting power PWR_0. The specific values d1 and d2 may be the same or different, depending on practical situation.

Furthermore, in an embodiment, the processing unit 16 may perform human face recognition on the image IMG, and generate a human-face recognition result Rst, where the human-face recognition result Rst may indicate that "a human face image is included in the image IMG" or "no human face image is included in the image IMG". In this case, the processing unit 16 may adjust the emitting power PWR according to the human-face recognition result Rst and the distance D. For example, when the human-face recognition result Rst indicates that a human face image is included in the image IMG and the distance D is less than a specific value d3, the processing unit 16 may adjust the emitting power PWR lower (i.e., the adjusted emitting power PWR is less than the initial emitting power PWR_0) or not adjust the emitting power PWR (i.e., the adjusted emitting power PWR is equal to the initial emitting power PWR_0). In other words, when the human-face recognition result Rst indicates that a human face image is included in the image IMG and the distance D is less than the specific value d3, the processing unit 16 does not increase the emitting power PWR any more (i.e., the adjusted emitting power PWR would not be greater than the initial emitting power PWR_0).

In addition, in an embodiment, after the processing unit 16 finishes executing the power control method 20, the processing unit 16 may treat the adjust emitting power PWR, derived by Step 208 in the previously/latest execution, as the initial emitting power PWR_0 for the next execution of power control method 20, and execute the power control method 20 again and so on and so forth, meaning that the power control method 20 is executed iteratively. Until certain stopping criterion is satisfied, then the processing unit 16 ceases executing the power control method 20. Moreover, the certain stopping criterion may be an iteration number of executing the power control method 20 being equal to a predefined iteration number, or an SNR for ToF distance measurement being larger or equal to a threshold.

Furthermore, before the distance measuring module 10 executes the power control method 20 in the first time/iteration, the processing unit 16 may determine the initial emitting power PWR_0 according to an ambient light. Specifically, the distance measuring module 10 may utilize the light sensing unit 14 to receive an ambient light and obtain the ambient light strength before the light emitting unit 12 emitting the incident light for distance measurement. The distance measuring module 10 may determine the initial emitting power PWR_0, according to the ambient light strength, for the first execution of the power control method 20.

Notably, the embodiments stated in the above are utilized for illustrating the concept of the present invention/application. Those skilled in the art may make modifications and alterations accordingly, and not limited herein. For example, the present application is not limited to determining the distance D according to the plurality of pixel depth values corresponding to the plurality of pixels in the image IMG, the distance measuring module may determine directly the distance D according to the reflected light itself (e.g., obtaining a phase difference between the reflected light and the incident light), which is also within the scope of the present application.

In summary, the embodiments of the present application may adjust the emitting power of the light emitting unit according to the distance between the distance measuring module and the target and also the human-face recognition result, which is capable of preventing the eyes of the user from receiving too much radiation energy and being harmed, and also saving electric power.

The foregoing is only embodiments of the present application, which is not intended to limit the present application. Any modification following the spirit and principle of the present application, equivalent substitutions, improvements should be included within the scope of the present application.

What is claimed is:

1. A power control method, applied in a distance measuring module comprising a light emitting unit, characterized by, the power control method comprising:
   the light emitting unit emitting an incident light by a first emitting power in a first time;
   receiving a reflected light corresponding to the incident light;
   determining a distance between the distance measuring module and a target according to the reflected light;
   obtaining a first image according to the reflected light;
   performing human face recognition on the first image, and generating a recognition result; and
   adjusting an emitting power of the light emitting unit according to the recognition result and the distance.

2. The power control method as claim 1, characterized in that, the step of adjusting an emitting power of the light emitting unit according to the distance comprises:
   adjusting the emitting power to be greater than the first emitting power when the distance is greater than a specific value.

3. The power control method as claim 1, characterized in that, the step of adjusting an emitting power of the light emitting unit according to the distance comprises:
   adjusting the emitting power to be less than or equal to the first emitting power when the distance is less than a specific value.

4. The power control method as claim 1, characterized in that, the step of determining a distance between the distance measuring module and a target according to the reflected light comprises:
   obtaining an image according to the reflected light, wherein the image comprises a plurality of pixels;
   obtaining a plurality of pixel depth values corresponding to the plurality of pixels; and
   determining the distance between the distance measuring module and the target according to the plurality of pixel depth values.

5. The power control method as claim 4, characterized in that, the step of determining the distance between the distance measuring module and the target according to the plurality of pixel depth values comprises:
  determining the distance between the distance measuring module and the target to be a first depth value, when a pixel number, corresponding to a plurality of first pixels among the plurality of pixels, is greater than a specific number;
  wherein a pixel depth value corresponding to each first pixel is less than the first depth value.

6. The power control method as claim 4, characterized in that, the step of determining the distance between the distance measuring module and the target according to the plurality of pixel depth values comprises:
  determining the distance between the distance measuring module and the target to be a statistic of the plurality of pixel depth values.

7. The power control method as claim 1, characterized in that, the step of adjusting the emitting power of the light emitting unit according to the recognition result and the distance comprises:
  no more increasing the emitting power when the recognition result indicates that a human face image is included in the first image and the distance is less than a specific value.

8. The power control method as claim 1, characterized in that, the first time is less than a specific time interval.

9. The power control method as claim 1, characterized in that, before the light emitting unit emits the incident light by the first emitting power, the power control method further comprises:
  receiving an ambient light; and
  determining the first emitting power according to the ambient light.

10. A distance measuring module, characterized by, comprising:
  a light emitting unit, emitting an incident light by a first emitting power in a first time;
  a light sensing unit, receiving a reflected light corresponding to the incident light and obtaining a first image according to the reflected light; and
  a processing unit, configured to execute the following steps:
    determining a distance between the distance measuring module and a target according to the reflected light;
    performing human face recognition on the first image, and generating a recognition result; and
    adjusting an emitting power of the light emitting unit according to the recognition result and the distance.

11. The distance measuring module as claim 10, characterized in that, the processing unit adjusts the emitting power to be greater than the first emitting power when the distance is greater than a specific value.

12. The distance measuring module as claim 10, characterized in that, the processing unit adjusts the emitting power to be less than or equal to the first emitting power when the distance is less than a specific value.

13. The distance measuring module as claim 10, characterized in that, the light sensing unit obtains an image according to the reflected light, wherein the image comprises a plurality of pixels; the processing unit obtains a plurality of pixel depth values corresponding to the plurality of pixels and determines the distance between the distance measuring module and the target according to the plurality of pixel depth values.

14. The distance measuring module as claim 13, characterized in that, the processing unit determines the distance between the distance measuring module and the target to be a first depth value when a pixel number, corresponding to a plurality of first pixels among the plurality of pixels, is greater than a specific number; wherein a pixel depth value corresponding to each first pixel is less than the first depth value.

15. The distance measuring module as claim 13, characterized in that, the processing unit is further configured to determine the distance between the distance measuring module and the target to be a statistic of the plurality of pixel depth values.

16. The distance measuring module as claim 10, characterized in that, when the recognition result indicates that a human face image is included in the first image and the distance is less than a specific value, the processing unit does not increase the emitting power.

17. The distance measuring module as claim 10, characterized in that, further comprising: the light sensing unit receives an ambient light; and the processing unit determines the first emitting power according to the ambient light.

18. An electronic device, characterized by, comprising a distance measuring module, the distance measuring module comprises
  a light emitting unit, emitting an incident light by a first emitting power in a first time;
  a light sensing unit, receiving a reflected light corresponding to the incident light and obtaining an image according to the reflected light; and
  a processing unit, configured to execute the following steps:
    determining a distance between the distance measuring module and a target according to the reflected light;
    performing human face recognition on the image, and generating a recognition result; and
    adjusting an emitting power of the light emitting unit according to the recognition result and the distance.

* * * * *